No. 786,417. PATENTED APR. 4, 1905.
H. H. CUTLER.
SYNCHRONOUS MOTOR WITH CLUTCH.
APPLICATION FILED JAN. 22, 1904.
3 SHEETS—SHEET 1.
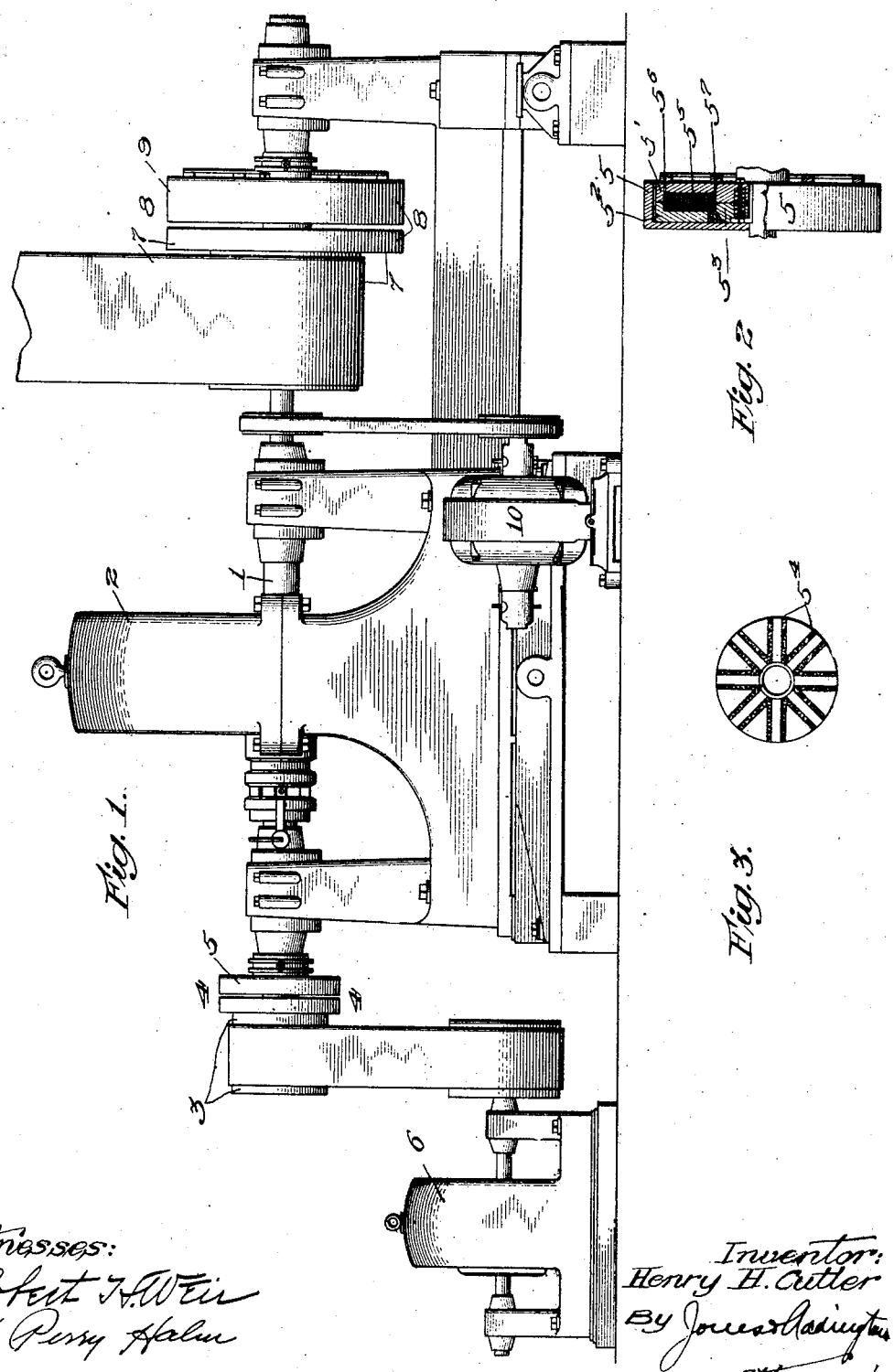
Witnesses:
Robert H. Weir
M. Perry Hahn
Inventor:
Henry H. Cutler
By Jones & Addington
Attorneys

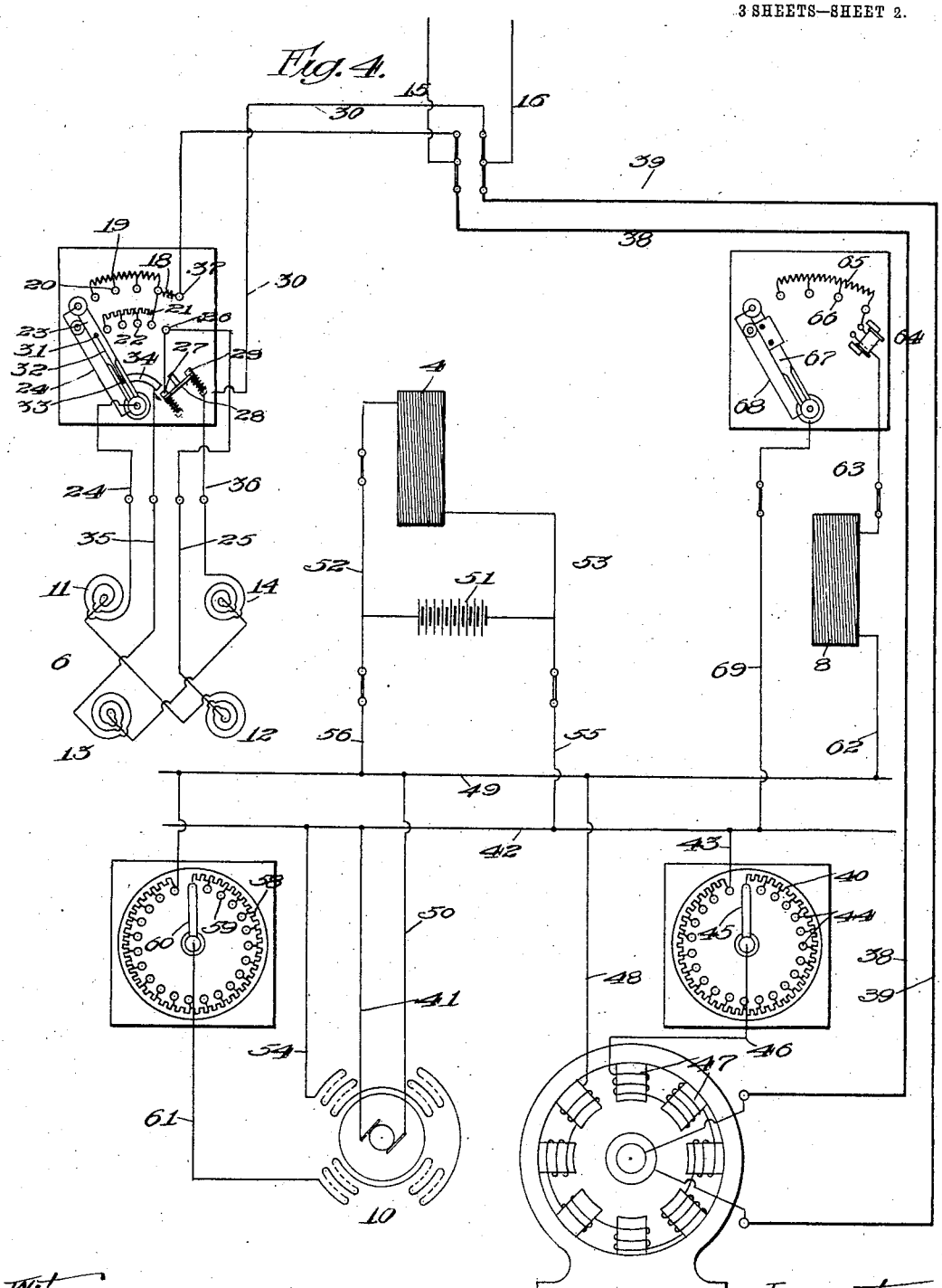

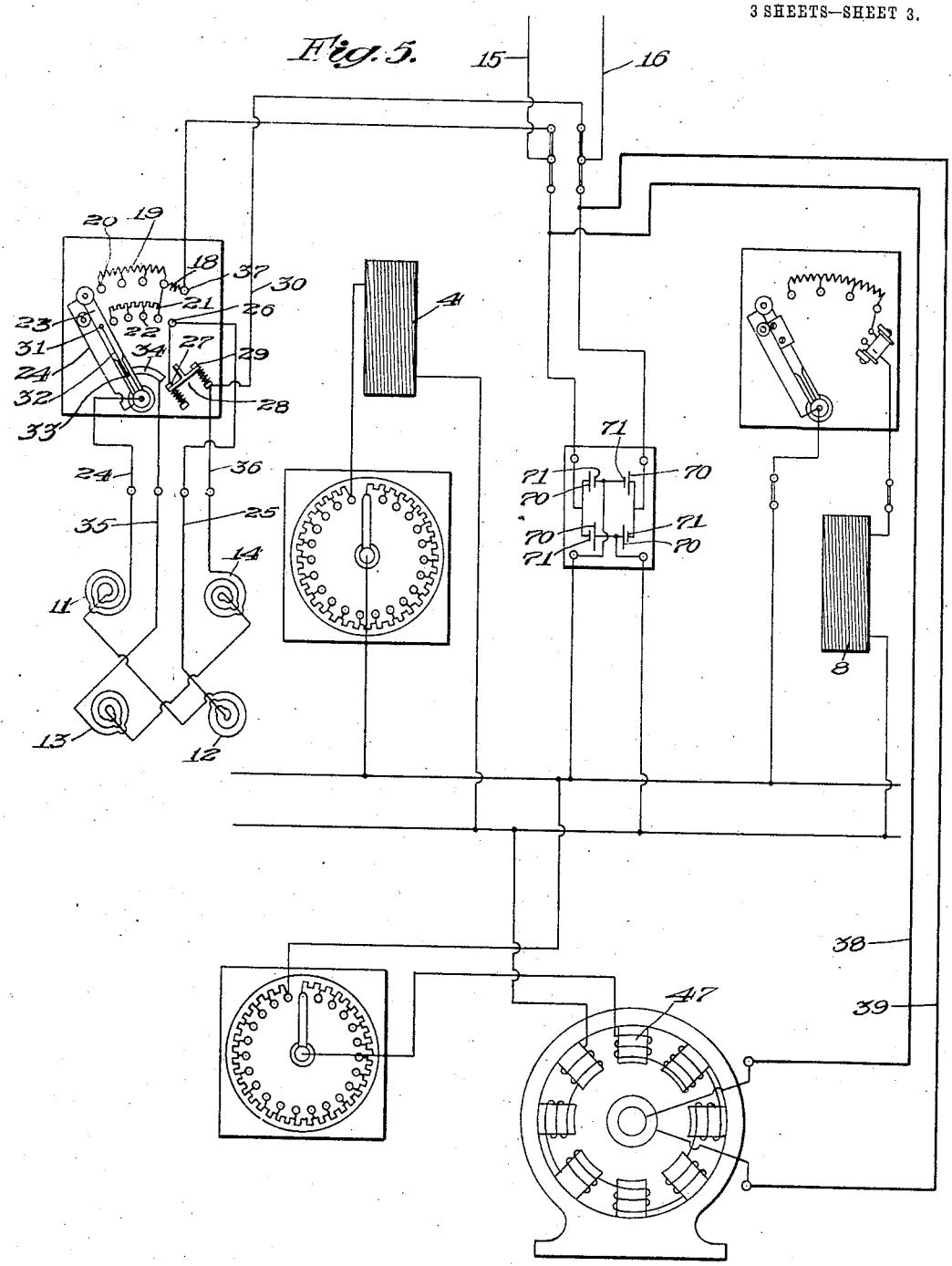

No. 786,417.

Patented April 4, 1905.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

SYNCHRONOUS MOTOR WITH CLUTCH.

SPECIFICATION forming part of Letters Patent No. 786,417, dated April 4, 1905.

Application filed January 22, 1904. Serial No. 190,145.

*To all whom it may concern:*

Be it known that I, HENRY H. CUTLER, a citizen of the United States, residing at Milwaukee, in the county of Milwaukee and State of Wisconsin, have invented a certain new and useful Improvement in Synchronous Motors with Clutches, of which the following is a full, clear, concise, and exact description, reference being had to the accompanying drawings, forming a part of this specification.

My invention relates to alternating-current power-transmitting apparatus, my object being to provide means whereby a synchronous alternating-current motor may be employed to efficiently and economically start and drive its load without strain upon the power-transmission system and to provide means whereby the part driven by the motor may be caused to rotate at any desired speed at will.

Alternating-current motors of the synchronous type ordinarily are not self-starting, and these motors of large size are usually started without load by means of an auxiliary starting device. After the motor has attained full speed it is connected in circuit and the load is imposed thereon usually through the agency of a friction-clutch, slipping belt, or similar device. The load is thus imposed abruptly, and it is one of my objects to provide means for preventing the abrupt application of the load heretofore resultant at starting. I also contemplate means for starting the motor by means of a small induction-motor, which when it has attained its full speed is connected with the armature of the synchronous motor through the agency of a controllable slip device to thereby bring the armature up to its full speed. After the armature has attained its full speed the field-circuit of the motor is connected in circuit to cause the motor to operate as a synchronous motor and the small induction-motor is cut out of circuit. The load is imposed on the motor gradually by means of a controllable slip device without disturbing the system.

In an application filed by me on the 28th day of January, 1904, Serial No. 190,968, I have shown and described a non-synchronous or induction motor with a controllable clutch.

I have illustrated the preferred embodiment of my invention in the accompanying drawings, in which—

Figure 1 is an elevation of the structure of my invention. Fig. 2 is a partial section of my clutch or accelerator. Fig. 3 is a face view of the primary member of the clutch or accelerator. Fig. 4 is a diagrammatic view showing the circuit arrangement, and Fig. 5 is a diagrammatic view of a modification.

Like numerals refer to like parts throughout the several figures of the drawings.

In carrying out my invention I provide upon the shaft 1 of an alternating-current synchronous motor 2 a loose pulley 3, which in the present instance constitutes the secondary or induced member of a magnetic clutch or accelerator 4, the primary member 5 of which is keyed to the shaft 1. The primary or inducing member of this clutch is constructed in accordance with the invention of an application filed by me on the 5th day of August, 1903, Serial No. 168,388, and consists, briefly, of a back plate $5'$, to which are secured a pair of rings $5^2$ $5^3$, the ring $5^2$ carrying inwardly-extending polar projections and the ring $5^3$ carrying outwardly-extending polar projections, the two sets of poles being arranged in overlapping positions, as shown in Fig. 3. The spaces between the pole-pieces are filled with non-magnetic material $5^4$, which may be Babbitt metal or equivalent material. Inclosed within the primary member is the energizing-winding $5^5$, which is shown of annular form. The terminals of the winding $5^5$ are connected, respectively, with the contact-rings $5^6$ $5^7$, upon which rest suitable brushes, which serve to convey the current to the clutch-winding. A single-phase induction-motor 6 is connected by means of a belt with the pulley 3, and serves when the clutch is energized to bring the armature of the motor 2 up to speed. Upon the opposite side of the shaft 1 is mounted a loose pulley 7, constituting the secondary or induced member of a magnetic clutch 8, of the same construction as the clutch 4, the primary member 9 of which is keyed to said shaft 1 and when energized operates to impose the load upon the motor 2. For supplying direct current to the clutches 4 and 8 and to the field of the synchronous motor I provide an exciter 10, belted to and driven by the shaft 1 of the motor 2.

As shown in Fig. 4, I have illustrated the starting-motor 6 as being a single-phase induction-motor having, say, four field-coils 11, 12, 13, and 14. I have selected this number of coils merely for the purpose of illustration, and I have not illustrated the rotor or secondary member of the motor; but it will be understood that the usual secondary element of a single-phase induction-motor is contemplated. With the supply-main 15 a resistance 18 is connected and likewise a resistance 19, which is subdivided into a plurality of sections connected with the terminals 20. A second resistance 21 is also employed and is likewise subdivided into sections, which are connected with the terminals 22. One of the resistances—as, for instance, the resistance 19—is non-inductive in character. The resistance 21 is inductive in character and the resistance 18 may be non-inductive, it being provided for the purpose of reducing the potential supplied to the field of the motor at starting. A contact-arm 23 is provided with a contact-brush connected by conductors 24 24 through the field-windings 11 and 12, thence by conductor 25 to terminals 26 and 27, thence across bridge 28 to terminal 29, thence by conductor 30 to the opposite main 16 of the supply-circuit. The contact-arm 23 carries brush 31, adapted to sweep over the terminals 22, this brush being connected by conductor 32 with a brush 33, adapted to sweep over contact-bar 34, which bar is connected by conductor 35 through windings 13 and 14, thence by conductor 36 to conductor 30 and main 16. When the contact-arm 22 has been moved to the extreme position to the right, the brush upon the end thereof engages terminal 37, the brush 31 engages terminal 26, and the bridge 28 is moved by means of the contact-arm out of engagement with the terminals 29 and 27.

The synchronous motor employed is of the usual type, having its armature supplied with an alternating current and its fields with a direct current, and is shown in the accompanying drawings as having its armature connected between the conductors 38 and 39, leading from the supply-mains 15 and 16, respectively. The field is supplied with a direct current by the exciter 10. One terminal of the exciter is connected with the resistance 40 of a controller by conductors 41, 42, and 43. The controller is of the usual type, having its resistance 40 subdivided into sections, which are connected with the terminals 44, over which a contact-arm 45 is adapted to sweep. The contact-arm is connected by conductor 46 through the field 47 of the motor, conductors 48, 49, and 50 with the opposite terminal of the exciter 10.

The small clutch 4 is initially supplied with a direct current from a storage battery 51, connected between the conductors 52 and 53, leading from the opposite terminals of the clutch-winding. After the exciter has been started direct current is then supplied to the clutch 4 by the exciter 10, one terminal of the exciter being connected by the conductors 54, 42, 55, and 53 with one terminal of the clutch. The opposite terminal of the clutch is connected by conductors 52, 56, 49, and 57 with the resistance 58 of a controller. The controller is of the usual type, having its resistance subdivided into sections which are connected with the terminals 59, over which terminals a contact-arm 60 is adapted to sweep. The contact-arm 60 is connected by the conductor 61 with the opposite terminal of the exciter 10. The large clutch 8 is also supplied with a direct current from the exciter 10, one terminal of the clutch being connected by conductors 62, 49, and 50 with one terminal of the exciter. The opposite terminal of the clutch-winding is connected by the conductor 63 through a small retaining-magnet 64 with a resistance 65. The resistance 65 is subdivided into sections, which are connected with terminals 66, over which a brush carried by a contact-arm 67 is adapted to sweep. The brush is connected by conductors 68, 69, 42, and 41 with the opposite terminal of the exciter 10. When the contact-arm 67 is in its full "on" position, it is held against being returned to its initial or "off" position under action of a spring arranged at its pivot by the retaining-magnet 64.

The operation of starting the motor is as follows: The parts being initially as shown in Fig. 4 the operator moves the contact-arm 23 to the right, accordingly cutting out the resistance 19 and 21. Circuit is closed from main 15 through resistance 18, resistance 19, conductor 24, field-windings 11 and 12, conductor 25, terminals 26 and 27, across the bridge 28 to terminal 29, conductor 30, to the opposite main 16. Circuit is closed from main 15 through resistance 18, resistance 21, brush 31, conductor 32, brush 33, contact 34, conductor 35, fields 13 and 14, conductor 36, conductor 30 to the opposite main 16. Since the resistance 19 is non-inductive, while the resistance 21 is inductive, the current passing through the resistance 21 will be retarded in phase, and accordingly the field-windings are subjected to currents of different phase, which produce a rotating magnetic field, thereby starting the armature or secondary member of the motor. As the contact-arm is moved to the right to cut out the resistance the armature gradually builds up in speed, while the contact-arm is moved over the series of terminals 20 22. The fields which are thus connected in two parallel paths are subject to practically one-half of the normal voltage of the supply-circuit, due to the interposition of the resistance 18. When the contact-arm has been moved to the extreme right—that is, to the full on position—the bridge 28 is moved out of engagement with the terminals 29 and 27, and the fields are thereby connected in series, the resistance 18 being at the same time removed from circuit so that the full voltage of the supply-circuit is imposed upon the circuit containing the field-windings. This circuit may be traced from main 15 to terminal 37, thence by conductor 24, through field-windings 11 and 12, conductor 25 to terminal 26, brush 31, conductor 32, brush 33, contact 34, conductor 35, field-windings 13 14, conductors 36 and 30 to the opposite main 16. The motor having attained full speed, the clutch 4 is energized and the armature of the motor 2 is brought up to speed, the current from the storage battery 51 passing by conductor 52 through the clutch-winding and thence by conductor 53 to the opposite side of the battery. The direct current-exciter 10 is then switched into the field-circuit of the motor 2, the circuit being traced from one terminal of the exciter through the conductors 41, 42, and 43, through the resistance 40, the contact-arm 45, through conductor 46, through the fields 47, and through conductors 48, 49, and 50 to the opposite terminal of the exciter 10. The armature of the motor 2 is then connected in circuit, the circuit passing from the main 15 through conductor 38, through the armature, thence through conductor 39 to the opposite main 16. The field and the armature being thus excited, the motor 2 operates as a synchronous single-phase motor. The induction-motor may now be removed from circuit and disconnected from the motor 2. When it is desired to impose the load upon the motor, the operator moves the contact-arm 67 to the right, accordingly cutting out the resistance 65. Circuit is closed from one terminal of the exciter 10, through the conductors 41 42 69 68, through the resistance 65, through the magnet 64, conductor 63, through the clutch-winding, from thence through conductors 62, 49, and 50 to the opposite terminal of the exciter. By means of the resistance 65 the driven member of the clutch may be started from rest and gradually accelerated in speed as the resistance is removed from the circuit of the clutch-winding by moving the contact-arm 67 to the right. When the resistance has all been removed from circuit, the clutch-winding is energized to the maximum extent, and the energization is sufficient to bring the driven part to full speed, and this is effected with the motor working at an effective speed, with relatively high efficiency and power factor, and the electrical pressure of the distributing-circuits has not been unduly disturbed. When the contact-arm reaches the full on position, it is grasped by the retaining-magnet 64 and held in this position during normal operation.

In Fig. 5 I have shown a modification of my invention whereby instead of using an exciter I use a rectifier for supplying direct current to the fields of the motor and to the two clutches. The rectifier may be of any desired construction and in the present instance is illustrated diagrammatically as a rectifier of the aluminium iron type, in which the longer transverse lines 70 represent, say, iron, while the shorter lines 71 represent aluminium. The current from the alternating-current circuit will pass between these cells in one direction only. Accordingly with the cells disposed as illustrated a rectified current will be delivered to the secondary supply-circuit containing the fields of the motor and the two clutch-windings.

Having described my invention, what I claim as new, and desire to secure by Letters Patent, is—

1. The combination with an alternating-current-supply circuit and a synchronous alternating-current motor, of an inherently gradually accelerating magnetic clutch associated therewith, whereby the load may be imposed without disturbing the supply-circuit.

2. The combination with an alternating-current-supply circuit and a synchronous alternating-current motor, of an inherently gradually accelerating magnetic clutch associated therewith, and a controller for said clutch.

3. The combination with an alternating-current-supply circuit and a synchronous alternating-current motor, of an inherently gradually accelerating clutch or accelerator associated therewith, and suitable means for supplying direct current to said clutch.

4. The combination with a synchronous alternating-current motor, of suitable starting means therefor, and an inherently gradually accelerating magnetic clutch associated therewith, whereby the load may be imposed without disturbing the supply-circuit.

5. The combination with a synchronous alternating-current motor, of an induction-motor for starting the same, and an inherently gradually accelerating magnetic clutch associated therewith, whereby the load may be imposed without disturbing the supply-circuit.

6. The combination with a synchronous alternating-current motor, of an induction-motor for starting the same, and an inherently gradually accelerating magnetic clutch interposed between said motors.

7. The combination with a synchronous alternating-current motor, of an induction-motor for starting the same, and an inherently gradually accelerating magnetic clutch interposed between said motors and a controller for said clutches.

8. The combination with an alternating-current-supply circuit and a synchronous alternating-current motor, of a controllable magnetic clutch whose driven member is accelerated through the combined influence of induction and friction associated therewith, whereby the load may be imposed without disturbing said supply-circuit.

9. The combination with an alternating-current-supply circuit and a synchronous alternating-current motor, of a controllable magnetic clutch whose driven member is accelerated through the combined influence of induction and friction associated therewith, and a controller for said clutch.

10. The combination with an alternating-current-supply circuit and a synchronous alternating-current motor, of a controllable magnetic clutch or accelerator whose driven member is accelerated through the combined influence of induction and friction associated therewith, and suitable means for supplying direct current to said clutch.

11. The combination with a synchronous alternating-current motor, of suitable starting means therefor and a controllable magnetic clutch whose driven member is accelerated through the combined influence of induction and friction associated therewith, whereby the load may be imposed without disturbing the supply-circuit.

12. The combination with a synchronous alternating-current motor, of an induction-motor for starting the same and a controllable magnetic clutch whose driven member is accelerated through the combined influence of induction and friction associated therewith, whereby the load may be imposed without disturbing the supply-circuit.

13. The combination with a synchronous alternating-current motor, of an induction-motor for starting the same, and a controllable magnetic clutch whose driven member is accelerated through the combined influence of induction and friction interposed between said motors.

14. The combination with a synchronous alternating-current motor, of an induction-motor for starting the same, a controllable magnetic clutch whose driven member is accelerated through the combined influence of induction and friction interposed between said motors, and a controller for said clutch.

15. The combination with a synchronous alternating-current motor, of an induction-motor for starting the same, a controllable magnetic clutch interposed between said motors and a controllable load-controlling magnetic clutch associated with said synchronous motor.

16. The combination with a synchronous alternating-current motor, of an induction-motor for starting the same, a controllable magnetic clutch interposed between said motors, a controllable load-controlling magnetic clutch associated with said synchronous motor, and a controller for each of said clutches.

17. The combination with a synchronous alternating-current motor, of a controllable magnetic clutch associated therewith, and means for supplying direct current to the fields of said motor and to said clutch.

18. The combination with a synchronous alternating-current motor, of an induction-motor for starting the same, a controllable magnetic clutch interposed between said motors, a controllable load-controlling magnetic clutch associated with said synchronous motor, and means for supplying a direct current to the fields of said synchronous motor and to said clutches.

19. The combination with a synchronous alternating-current motor, of a controllable magnetic clutch associated therewith, and an exciter for supplying a direct current to the fields of said motor and to said clutch.

20. The combination with a synchronous alternating-current motor, of an induction-motor for starting the same, a controllable magnetic clutch interposed between said motors, a controllable load-controlling magnetic clutch associated with said synchronous motor, and means for supplying direct current to the fields of said synchronous motor and to said clutches.

21. The combination with a synchronous alternating-current motor, of an induction-motor for starting the same, a controllable magnetic clutch interposed between said motors, a controllable load-controlling magnetic clutch associated with said synchronous motor, and an exciter for supplying a direct current to the fields of said synchronous motor and to said clutches.

22. The combination with a synchronous alternating-current motor, of an induction-motor for starting the same, a controllable magnetic clutch interposed between said motors, and means for supplying the fields of said motor and said clutch with a direct current.

23. The combination with a synchronous alternating-current motor, of an induction-motor for starting the same, a controllable magnetic clutch interposed between said motors, and an exciter for supplying the fields of said synchronous motor and said clutch with a direct current.

24. The combination with a synchronous alternating-current motor, of an induction-motor for starting the same, a controllable magnetic clutch interposed between said motors, means for initially supplying said clutch with a direct current, and means operated by said synchronous motor for supplying said clutch with a direct current after the synchronous motor has started.

25. The combination with a synchronous alternating-current motor, of an induction-motor for starting the same, a controllable magnetic clutch interposed between said motors, a storage battery for initially supplying said clutch with a direct current, and an exciter for supplying said clutch with a direct current after the synchronous motor has been started.

26. Means for improving the power factor and efficiency of a loaded synchronous alternating-current motor, which consists in combining with the rotating part of the said motor and its load of provisions for controllable inductive and frictional slip between the said rotating part and the load.

27. The combination with the rotor of a synchronous alternating-current motor and the load thereof, of a controllable slip device between said rotor and the load, the slippage of said device being jointly inductive and frictional.

28. The combination with the rotor of a synchronous alternating-current motor and the load thereof, of a magnetic clutch arranged to introduce inductive and frictional slip between the said rotor and its load, and means for controlling the said slip so that the load may be effectually brought to full speed without undue disturbance of the electrical supply-circuits.

29. Means for gradually starting the load of a synchronous alternating-current motor, which consists in combination with the rotor of said motor, and the load thereof, of a controllable joint inductive and frictional magnetic clutch.

30. Means for improving the power factor and efficiency of a loaded synchronous alternating-current motor, which consists in combining with a rotating part of said motor and its load, of provision for a slip between said motor and its load, whose torque gradually decreases as the speed of the load accelerates, and means for increasing said torque.

31. Means for improving the power factor and efficiency of a loaded synchronous alternating-current motor, which consists in combining with a rotating part of said motor and its load, of provision for a slip between said motor and its load whose torque gradually decreases as the speed of the load accelerates, and means for increasing said torque at will.

In witness whereof I have hereunto subscribed my name in the presence of two witnesses.

HENRY H. CUTLER.

Witnesses:
   F. S. WILHOIT,
   T. E. BARNUM.